Jan. 6, 1942. E. CHRISTIANSEN 2,268,739

LINE DRIER

Filed Oct. 29, 1940

INVENTOR
Elvin Christiansen
BY
Harry Schroeder

Patented Jan. 6, 1942

2,268,739

UNITED STATES PATENT OFFICE 2,268,739

LINE DRIER

Elvin Christiansen, Hayward, Calif.

Application October 29, 1940, Serial No. 363,276

1 Claim. (Cl. 242—104)

This invention relates to devices upon which cordage or other filamentary material may be reeled and particularly to such a device adapted to hold fishing line while the latter is being dried.

It is an object of the invention to provide a simple device of the character described composed of a minimum number of parts.

Another object of the invention is to provide a line drier which may be securely held while the line is being reeled thereon.

The invention possesses other objects and features of advantage which will become apparent upon inspection of the appended detailed description of the invention when read in conjunction with the accompanying drawing in which.

Figure 1:
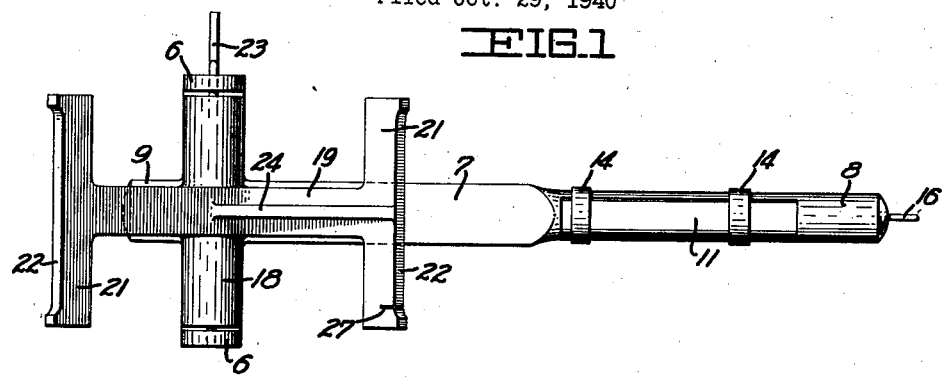
Figure 1 is a top plan view of the complete line drier of my invention.
Figure 2:
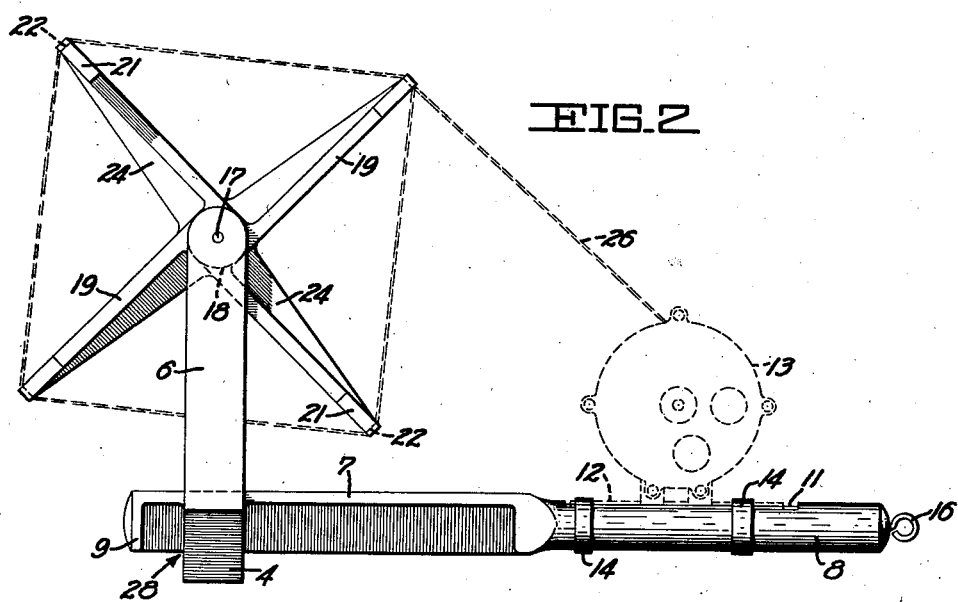
Figure 2 is a side elevational view of the structure shown in Figure 1.
Figure 3:
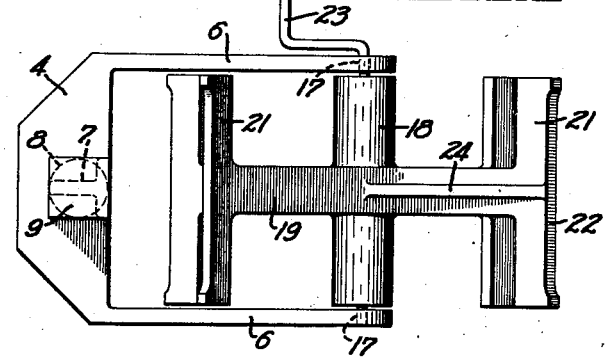
Figure 3 is an end elevational view of the structure shown in Figure 1.

In detail, the drier comprises a base 4 having a pair of arms 6 rising therefrom, and a shank 7, of T-shaped cross-section, extending therefrom at the distal end of which is provided a cylindrical handle 8. The shank 7 is also provided, on the other side of the base 4, with a stub extension 9. The base 4, shank 7 with its extension 9, the arms 6 and the handle 8 are all formed as an integral unit and are preferably molded from light-weight metal such as aluminum or, preferably, from a moldable plastic composition such as Bakelite. The handle 8 is provided with a longitudinally extending groove 11 in which may be seated the mounting flange 12 of a fishing reel 13 and rings 14, encircling and slidable axially of the handle 8, are provided for engaging the mounting flange 12 and for securing the reel 13 to the handle. A hanger ring 16, formed of wire and anchored in the end of the handle 8 is provided to permit the drier to be hung on a nail or hook when not in use.

The upper end of each of the arms 6 is apertured to receive and provide a journal for a drier rotor having an axle 17 upon which a hub 18 is fixedly mounted. The hub 18 has radiating therefrom a plurality, preferably four, of spokes 19 each having at its distal end a transverse head 21 provided along its outer edge with a relatively wide shallow notch 22. The hub 18, the spokes 19 and their associated heads 21 are, like the other component part of the drier, also molded in a unitary piece. The axle 17 is extended beyond the side of one of the arms 6 and is bent to form a crank 23 by means of which the hub 18 and its connected parts may be manually rotated. Each of the spokes 19 is strengthened by an integral rib 24 which extends along the back of the spoke and connects with the adjacent spoke.

When the reel 13 is seated in the groove 11 of the handle, the fishing line 26 is secured to one of the heads 21 either by tying the line thereto or by inserting the line in the slit 27 wherein it will be frictionally held against detachment. After the line 26 has been connected, the crank 23 may be rotated so as to wind all, or as much as desired of the line from the reel 13 onto the drier rotor. After the line has been suitably dried it may be again wound back onto the reel 13. During such reeling operations the stub extension 9 of the shank 7 facilitates handling of the drier since it forms, in conjunction with the adjacent vertical surface of the base 4, a V-shaped notch 28 in which the edge of a bench or table may be seated; the operator with the end of the handle 8 resting against the front of his body then pressing longitudinally against the drier so as to maintain the object seated in the notch 28. This frees both hands of the operator for use in handling the line 26 either in guiding it onto the drier rotor or onto the reel 13.

It will be noted that the device of my invention consists only of two major parts which are capable of economical manufacture and assembly. Furthermore, since the drier is constructed of waterproof material, the cracking or warping familiar in wooden drying frames is obviated.

Having thus described my invention in detail, what I claim as new and desire to secure by Letters Patent is:

A line drier comprising a base having a shank extending from one side thereof and a stub extension alined with said shank and projecting from the other side of said base, said stub extension having a surface thereof forming with a surface of the base a notch in which the edge of a supporting member may be seated, a handle on and integral with said shank, said handle having therein a longitudinally extending groove in which the mounting flange of a fishing reel may be seated, rings encircling and slidable axially of said handle to positions overlying said mounting flange and groove so as to secure said mounting flange in the groove, spaced parallel arms rising from said base, said arms, base, handle and stub extension thereof being molded as an integral unit, an axle extending between and journaled in said arms, said axle having a portion thereof, extending beyond one of the arms, bent to form a crank by means of which said axle may be manually rotated, a hub concentric with and secured to said axle, spokes extending radially from said hub, each of said spokes having at its distal end a transversely extending head provided in one edge with a notch, the respective heads cooperating to form a drier rotor upon which line from said fishing reel may be wound, and said hub, spokes and spoke heads being molded as an integral unit.

ELVIN CHRISTIANSEN.